(12) United States Patent
Lee et al.

(10) Patent No.: US 8,696,505 B2
(45) Date of Patent: Apr. 15, 2014

(54) HYBRID POWER TRAIN FOR VEHICLES

(75) Inventors: Jin Woo Lee, Ansan-si (KR); Jeong Heon Kam, Yongin-si (KR)

(73) Assignee: Hyundai Motor Company, Seoul (KR)

( * ) Notice: Subject to any disclaimer, the term of this patent is extended or adjusted under 35 U.S.C. 154(b) by 21 days.

(21) Appl. No.: 13/428,592

(22) Filed: Mar. 23, 2012

(65) Prior Publication Data

US 2013/0072337 A1    Mar. 21, 2013

(30) Foreign Application Priority Data

Sep. 19, 2011   (KR) ......................... 10-2011-0094015

(51) Int. Cl.
*F16H 3/38*    (2006.01)

(52) U.S. Cl.
USPC .................................. 475/5; 74/325; 74/329

(58) Field of Classification Search
USPC ............... 74/640, 665 R, 664, 329, 331, 339; 475/5, 198, 200
See application file for complete search history.

(56) References Cited

U.S. PATENT DOCUMENTS

| | | | | |
|---|---|---|---|---|
| 6,634,247 B2 * | 10/2003 | Pels et al. | ......................... | 74/329 |
| 6,712,734 B1 * | 3/2004 | Loeffler | ............................ | 477/5 |
| 2002/0088288 A1 * | 7/2002 | Bowen | ............................ | 74/331 |
| 2002/0104397 A1 * | 8/2002 | Bowen | ............................ | 74/329 |
| 2003/0069103 A1 * | 4/2003 | Ibamoto et al. | ...................... | 475/5 |
| 2005/0107198 A1 * | 5/2005 | Sowul et al. | ...................... | 475/5 |
| 2009/0143188 A1 * | 6/2009 | Soliman et al. | .................... | 477/5 |
| 2010/0132492 A1 * | 6/2010 | Holmes | ........................... | 74/331 |

* cited by examiner

*Primary Examiner* — David D Le
*Assistant Examiner* — Steven B Christ
(74) *Attorney, Agent, or Firm* — Morgan, Lewis & Bockius LLP

(57) ABSTRACT

A hybrid power train for vehicles uses a double clutch transmission (DCT) to further improve the fuel efficiency of a vehicle, obtain a sporty transmission, and prevent the entire length thereof from being excessively lengthened, thereby sufficiently securing the ability of being mounted in a vehicle.

8 Claims, 7 Drawing Sheets

HYBRID POWER TRAIN FOR VEHICLES

CROSS-REFERENCE TO RELATED APPLICATION

The present application claims priority of Korean Patent Application Number 10-2011-0094015 filed Sep. 19, 2011, the entire contents of which application is incorporated herein for all purposes by this reference.

BACKGROUND OF INVENTION

1. Field of Invention

The present invention relates, in general, to a hybrid power train for vehicles, and more particularly, to a structure of a power train for hybrid vehicles, using a double clutch transmission (DCT).

2. Description of Related Art

In order to cope with the increase in oil prices and the regulations concerning $CO_2$ in the environment that have recently increased, there is an actual need to further improve the fuel efficiency of vehicles. At the present time, improving the efficiency of a drive system which plays a part in the power transmission and improving the efficiency of an internal engine may be the most practical way to deal with such a need.

The most efficient transmission in conventional driving systems is a manual transmission. Since the transmission efficiency of a double clutch transmission (DCT) designed based on this manual transmission is superior to that of an automatic transmission (AT) or a continuously variable transmission (CVT), if a hybrid type transmission in which such an efficient DCT and an electric motor are combined together is designed, the fuel efficiency of the currently available internal engines can be further improved.

However, a conventional hybrid power train has a structure in which as shown in FIG. 1, an electric motor 504 is inserted between an engine 500 and a transmission 502, so that the length of the transmission shown in FIG. 1 becomes longer than that of the conventional AT or CVT since the structure of a conventional DCT generally is such that two clutches are disposed in an overlapped fashion in an axial direction. Such a structure makes much the entire length of a mounting space for the engine 500 and transmission longer, thereby reducing its ability to be mounted in a vehicle.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Accordingly, the present invention has been made keeping in mind the above problems occurring in the related art, and the present invention proposes a hybrid power train for vehicles which use a double clutch transmission (DCT) so as to further improve fuel efficiency of a vehicle, obtain sporty transmission, and avoid making much lengthy the entire length thereof, thereby sufficiently securing the ability of being mounted to a vehicle.

Various aspects of the present invention provide for a hybrid power train for vehicles including an input shaft having a driving gear, first and second driven gears respectively meshing with the driving gear, a first driving shaft concentrically connected to the first driven gear in the medium of a first clutch such that it is disposed parallel with the input shaft, a second driving shaft concentrically connected to the second driven gear in the medium of a second clutch such that it is disposed parallel with the input shaft, an output shaft disposed parallel with the first and second driving shafts, a plurality transmission driving gears respectively provided on the first and second driving shafts such that they respectively mesh with a plurality of transmission driven gears provided on the output shaft so as to obtain a multistage speed, a plurality of synchronizing devices enabling the plurality of transmission driving gears to synchronously mesh with the first or second driving shaft, and an electric motor having a rotary shaft disposed parallel with the first driving shaft, second driving shaft, and output shaft so as to provide power to the driving gear.

According to a hybrid power train for vehicles using a double clutch transmission, fuel efficiency of a vehicle is further improved, a sporty transmission is obtained, and the entire length thereof is prevented from being excessively lengthened, thereby sufficiently securing the ability of being mounted in a vehicle.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION OF THE INVENTION

Figure 1:
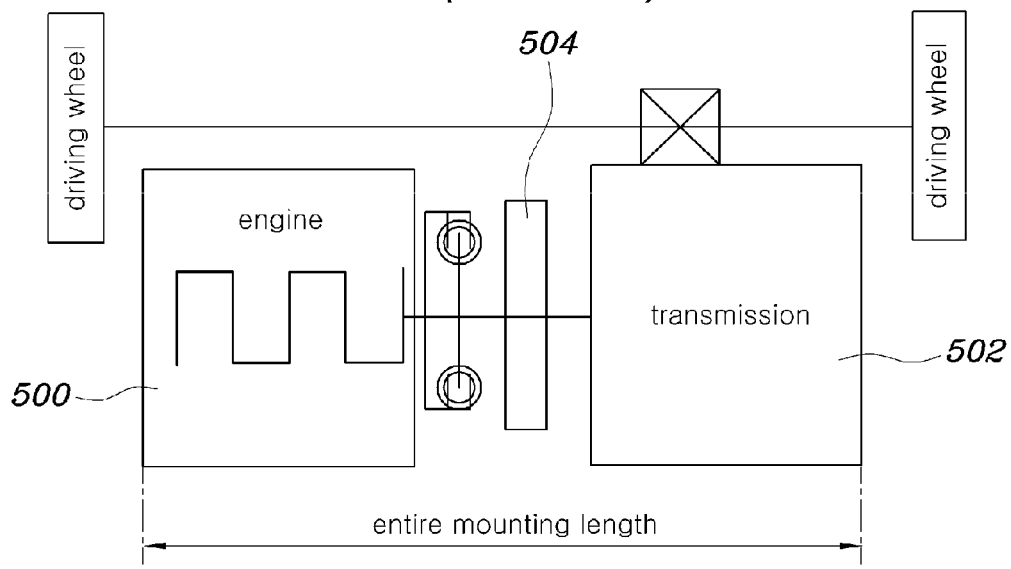
FIG. 1 is a view showing the structure of a hybrid power train according to the related art.

Reference will now be made in detail to various embodiments of the present invention(s), examples of which are illustrated in the accompanying drawings and described below. Wherever possible, the same reference numerals will be used throughout the drawings and the description to refer to the same or like parts. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 2:
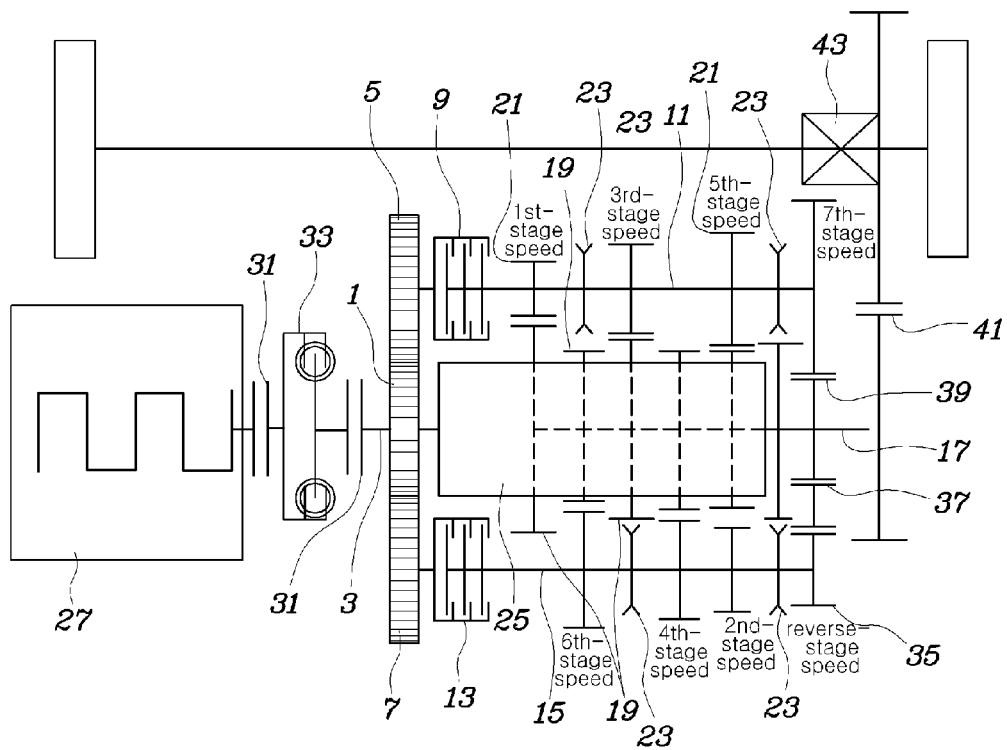
FIG. 2 is a view showing an exemplary hybrid power train for vehicles according to the present invention.

Referring to FIG. 2, a hybrid power train for vehicles according to various embodiments of the present invention includes: an input shaft 3 having a driving gear 1; first and second driven gears 5 and 7 respectively meshing with the driving gear 1; a first driving shaft 11 concentrically connected to the first driven gear 5 in the medium of a first clutch 9 such that it is disposed parallel with the input shaft 3; a second driving shaft 15 concentrically connected to the second driven gear 7 in the medium of a second clutch 13 such that it is disposed parallel with the input shaft 3; an output shaft 17 disposed parallel with the first and second driving shafts 11 and 15; a plurality transmission driving gears 21 respectively provided on the first and second driving shafts 11 and 15 such that they respectively mesh with a plurality of transmission driven gears 19 provided on the output shaft 17 so as to obtain a multistage speed; a plurality of synchronizing devices 23 enabling the plurality of transmission driving gears 21 to synchronously mesh with the first or second driving shaft 11 or 15; and an electric motor 25 having a rotary shaft disposed parallel with the first driving shaft 11, second driving shaft 15, and output shaft 17 so as to provide power to the driving gear 1.

The electric motor 25, first driving shaft 11, second driving shaft 15, and output shaft 17 overlap each other as much as possible so that they are arranged within the range defined by the longest shaft among them. The rotary shaft of the electric motor 25, first driving shaft 11, second driving shaft 15, and output shaft 17 are arranged in a rectangular structure.

That is, the electric motor, which is provided to supply power and the driving force, apart from an engine 27, is arranged such that it overlaps adjacent to the first driving shaft 11, second driving shaft 15, and output shaft 17 while being parallel with them, consequently resulting in all the former elements being arranged within the range defined by the longest element among them, thereby shortening by as much as possible the axial length of the transmission mechanism and electric motor.

Moreover, the first clutch 9 and second clutch 13, and the first input shaft 3 and second input shaft 3 enable the operation of a double clutch transmission (DCT) by selectively transmitting power supplied from the driving gear 1 by individually using the first and second clutches 9 and 13. In addition, they make the axial length shorter than in the case where conventional clutches overlap in the axial direction, thereby eventually minimizing the axial length defined by a transmission and electric motor 25.

Figure 3:
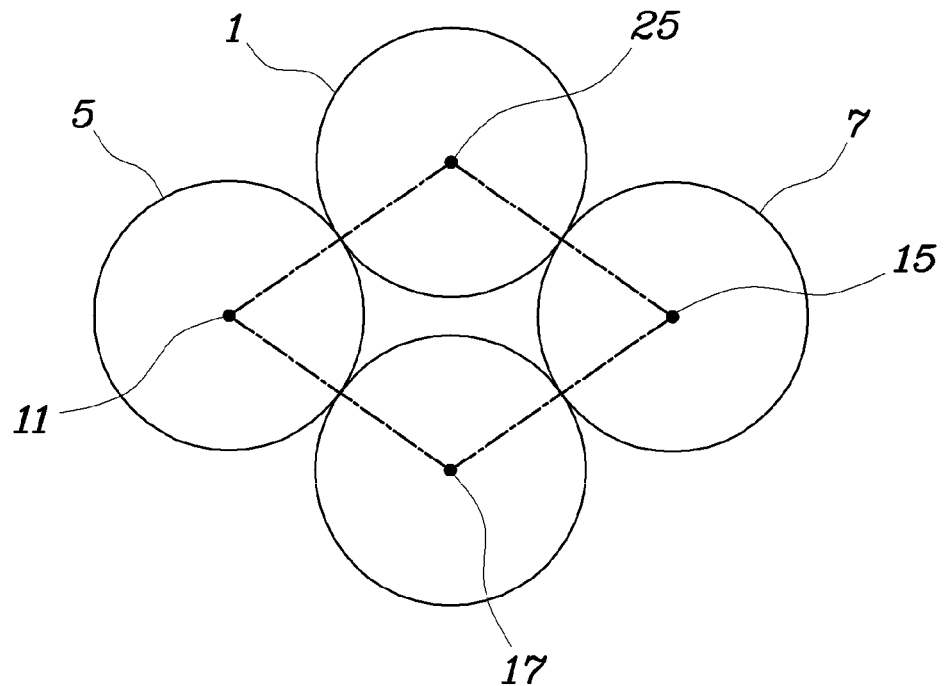
FIGS. 3 and 4 are views observing FIG. 2 in a side view for schematically explaining the connective relation between shafts.
Figure 4:
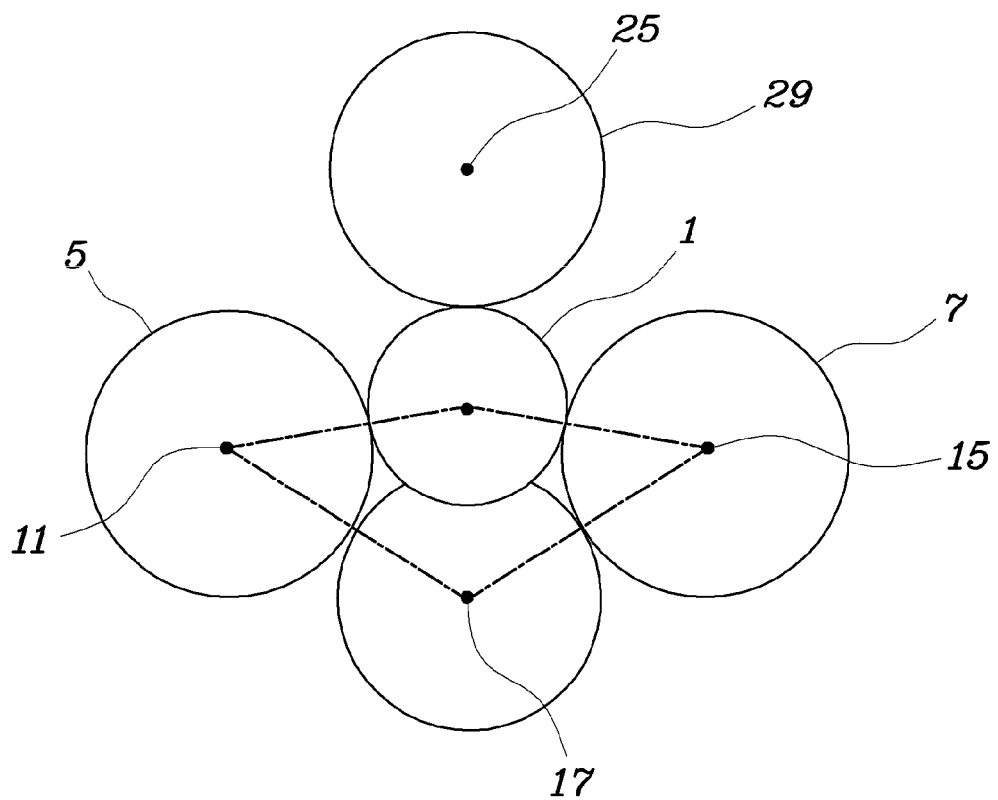

FIGS. 3 and 4 show the arrangement of the respective rotary shafts in a side view of the construction of FIG. 2. In FIG. 3, the rotary shaft of the electric motor 25 is integrally coupled with the input shaft 3 having the driving gear 1, concentrically with respect thereto. One will appreciate that the rotary shaft may be monolithically formed with the input shaft. In FIG. 4, a pinion 29 is coupled to the rotary shaft of the electric motor 25 such that it meshes with the driving gear 1, which means that the rotary shafts of the electric motor 25 and driving gear 1 may be arranged in a concentric or non-concentric manner with respect to each other.

The engine 27 is connected to the input shaft 3 having the driving gear 1 via a main clutch 31, so that the rotary shaft of the electric motor 25 is concentrically mounted to the engine according to various embodiments, or otherwise it is arranged with the engine in a parallel, but non-concentric manner with respect to the engine.

In various embodiments, besides the main clutch 31, a damper 33 is disposed between the engine 27 and the driving gear 1 in order to offset distortion vibrations of the engine 27. The main clutch 31 that is illustrated consists of two clutches on opposite sides of the damper 33, but it may consist of either of two clutches.

For reference, similar to the construction of a conventional DCT, the first driving shaft 11 is provided with odd number-speed transmission driving gears 21 in order to provide odd number speeds, and the second driving shaft 15 is provided with even number-speed transmission driving gears 21 in order to provide even number speeds. In addition, a reverse driving gear 35 is provided on the second driving gear 15 in order to drive a reverse driven gear 39 of the output shaft 17 via an idler gear 37.

With reference to FIG. 2, in various embodiments the hybrid power train may be mounted to a front engine front drive (FF) vehicle, wherein the output shaft 17 is provided with a final reduction gear 41, which meshes with a front wheel-differential gear 43 so as to drive a front wheel.

Figure 5:
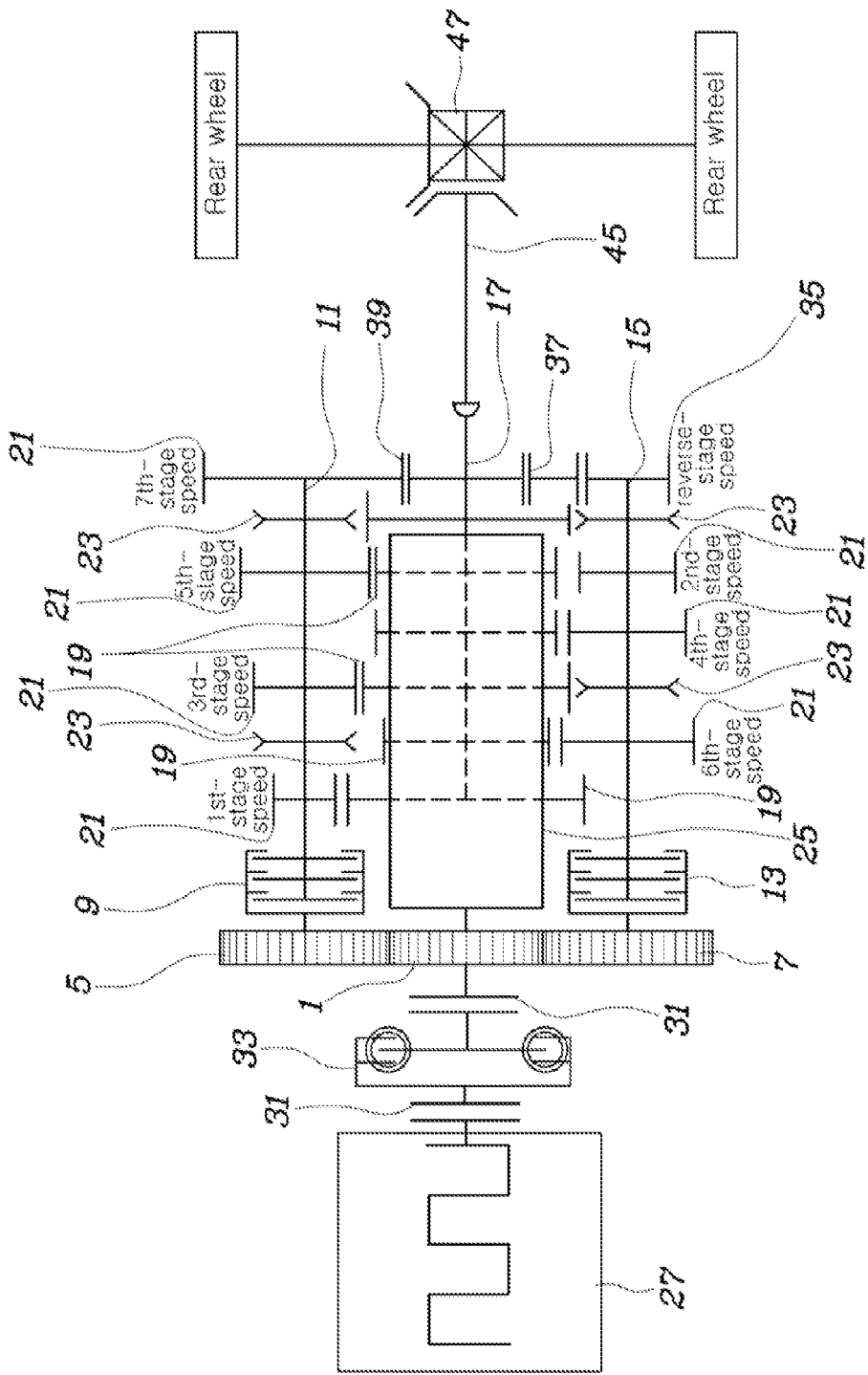
FIG. 5 is a view showing an exemplary hybrid power train for vehicles according to the present invention.

With reference to FIG. 5, in various embodiments, the hybrid power train may be mounted to a front engine rear drive (FR) vehicle, wherein a propeller shaft 45 is connected to the output shaft 17, and a rear wheel-differential gear 47 is connected to the propeller shaft 45, thereby driving a rear wheel.

The operation of the illustrated embodiment shown in FIG. 5 will be described with reference to FIGS. 6 to 8.

Figure 6:
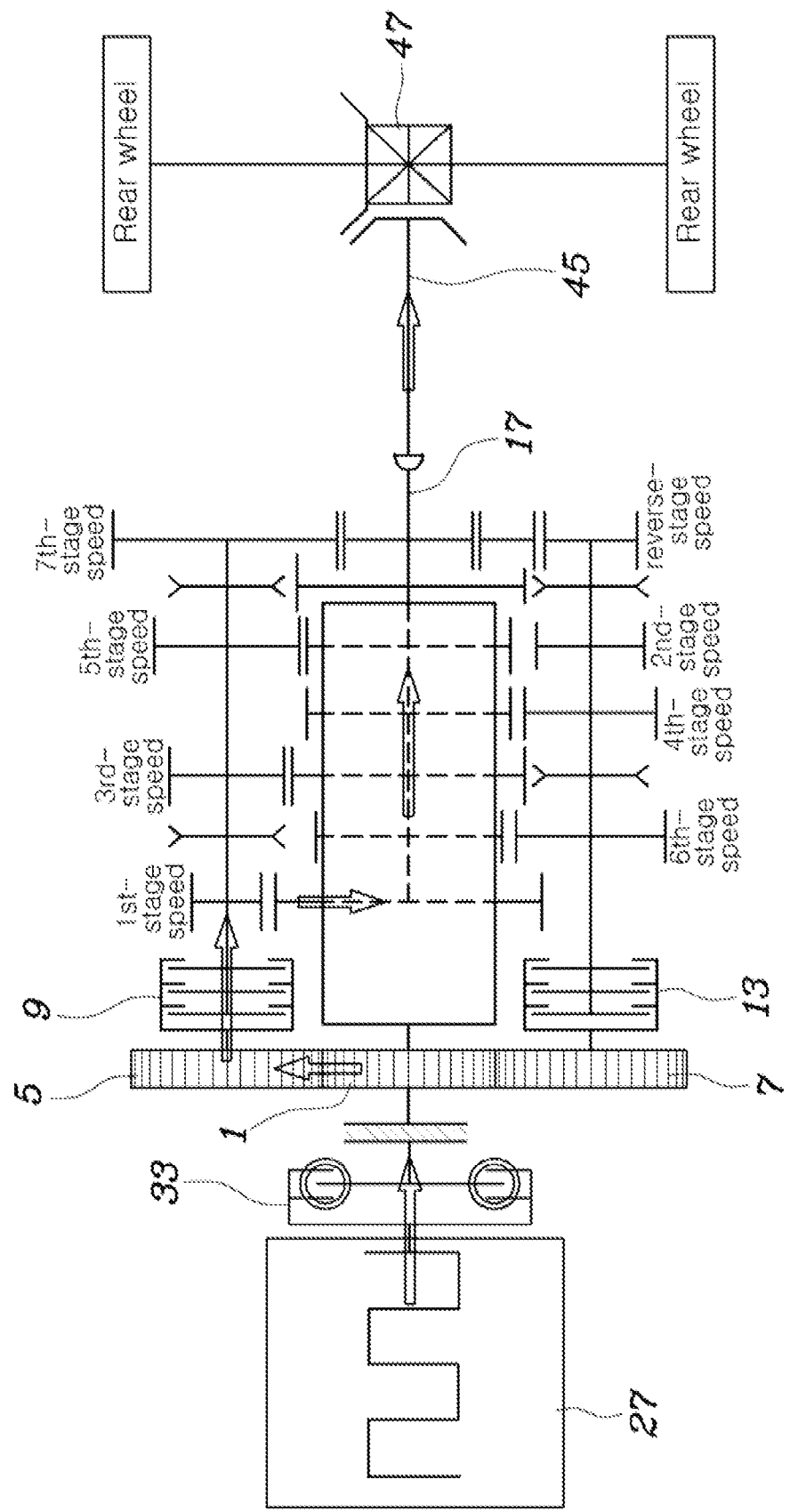
FIGS. 6 to 8 are views showing the operation of the hybrid power train of FIG. 5.

FIG. 6 shows the state in which a first-stage speed is accomplished with the driving force from the engine 27, while the electric motor 25 is not driven.

That is, power from the engine 27 drives the driving gear 1 of the input shaft 3 via the main clutch 31. Power from the driving gear 1 is concurrently supplied to the first and second driven gears 5 and 7. The rotation force of the first driven gear 5 rotates the first driving shaft 11 following the action of the first clutch 9. In the state in which the synchronizing device 23 enabled the first-stage speed transmission driving gear 21 to synchronously mesh with the first driving shaft 11, power from the first driving gear 11 rotates the output shaft 17 via the first-stage speed transmission driving gear 21 and transmission driven gear 19, thereby outputting the first-stage power via the output shaft 17.

Figure 7:
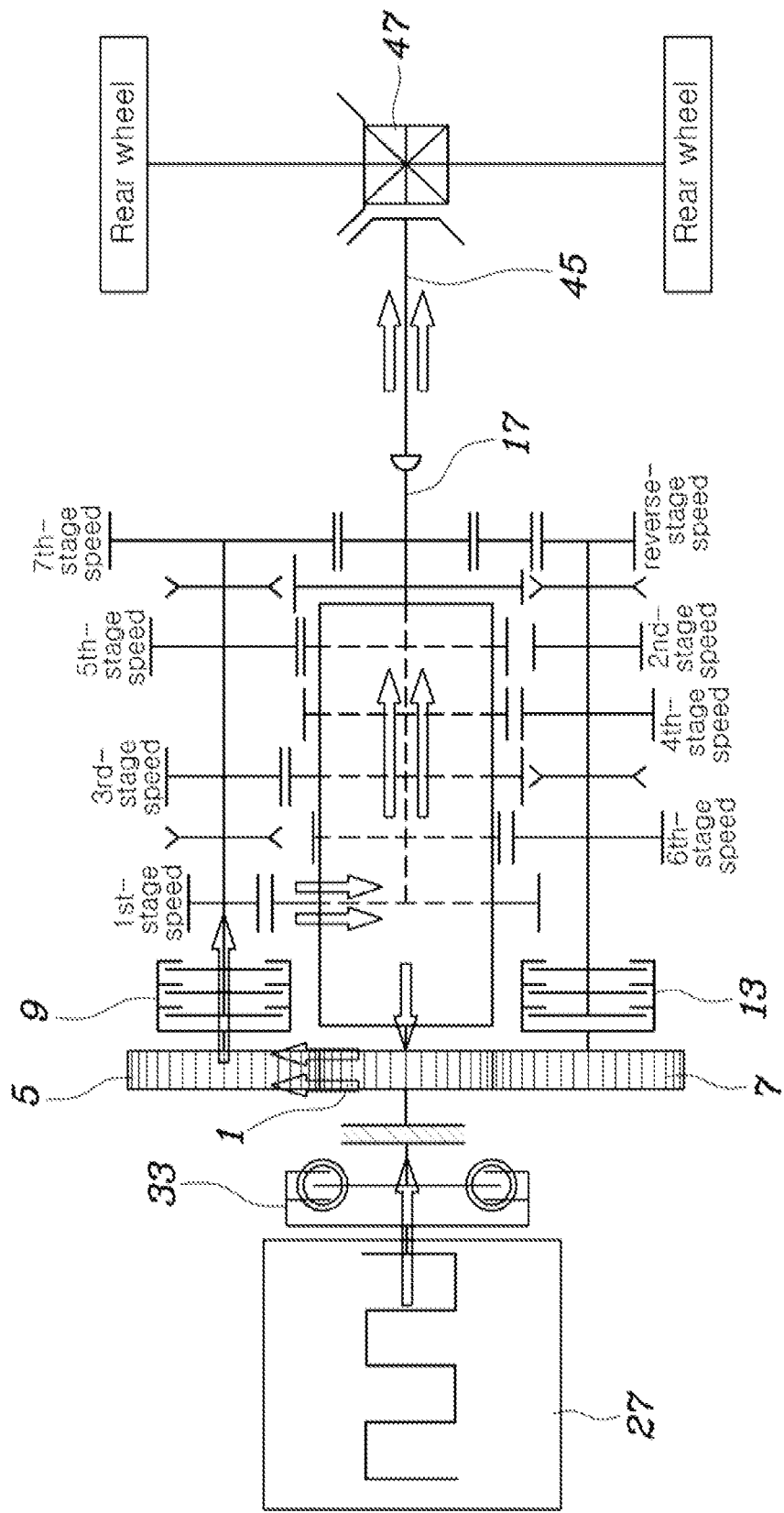

FIG. 7 shows the case where in the driven state shown in FIG. 6, power generated by the electric motor 25 is additionally applied. Here, the operation of FIG. 7 is the same as that of FIG. 6, except for the following operation. Since the driving force of the electric motor 25 is also provided to the driving gear 1, the power from the electric motor 25 is combined with the power from the engine 27, and the combined power is speed-changed to a first-stage speed and is output from the output shaft 17. Here, such a running mode means a hybrid running mode which can be used upon acceleration or when the vehicle is ascending.

Figure 8:
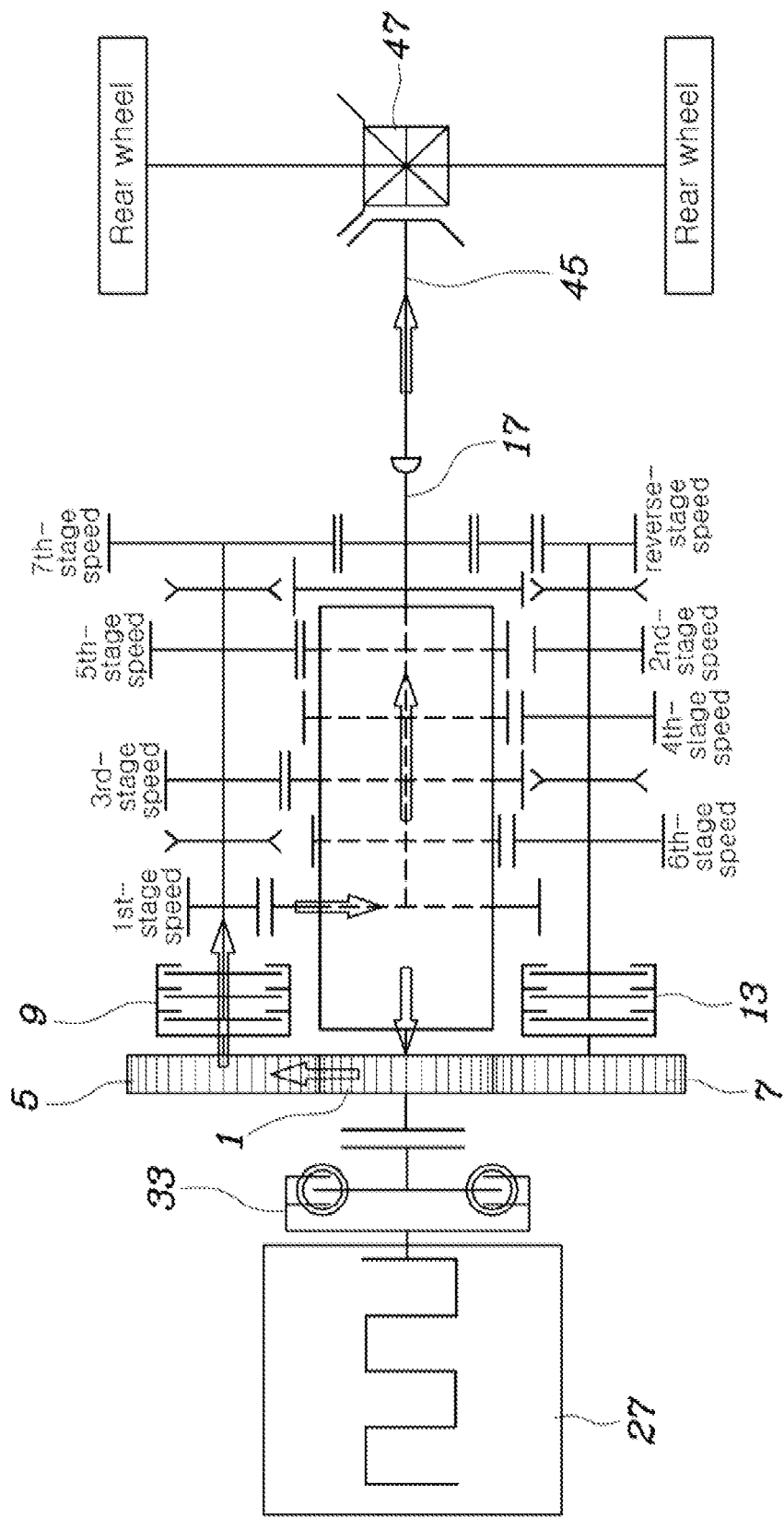

FIG. 8 shows the state in which the main clutch 31 is decoupled to stop the operation of the engine 27 in the driven state shown in FIG. 7, wherein the first-stage speed change is obtained by only power from the electric motor 25 so as to drive the output shaft 17. In this state, the vehicle is driven in a completely electric running mode.

Speed change or power flow to other transmission stages is the same as in a manual transmission or DCT, so description thereof will be omitted.

Figure 9:
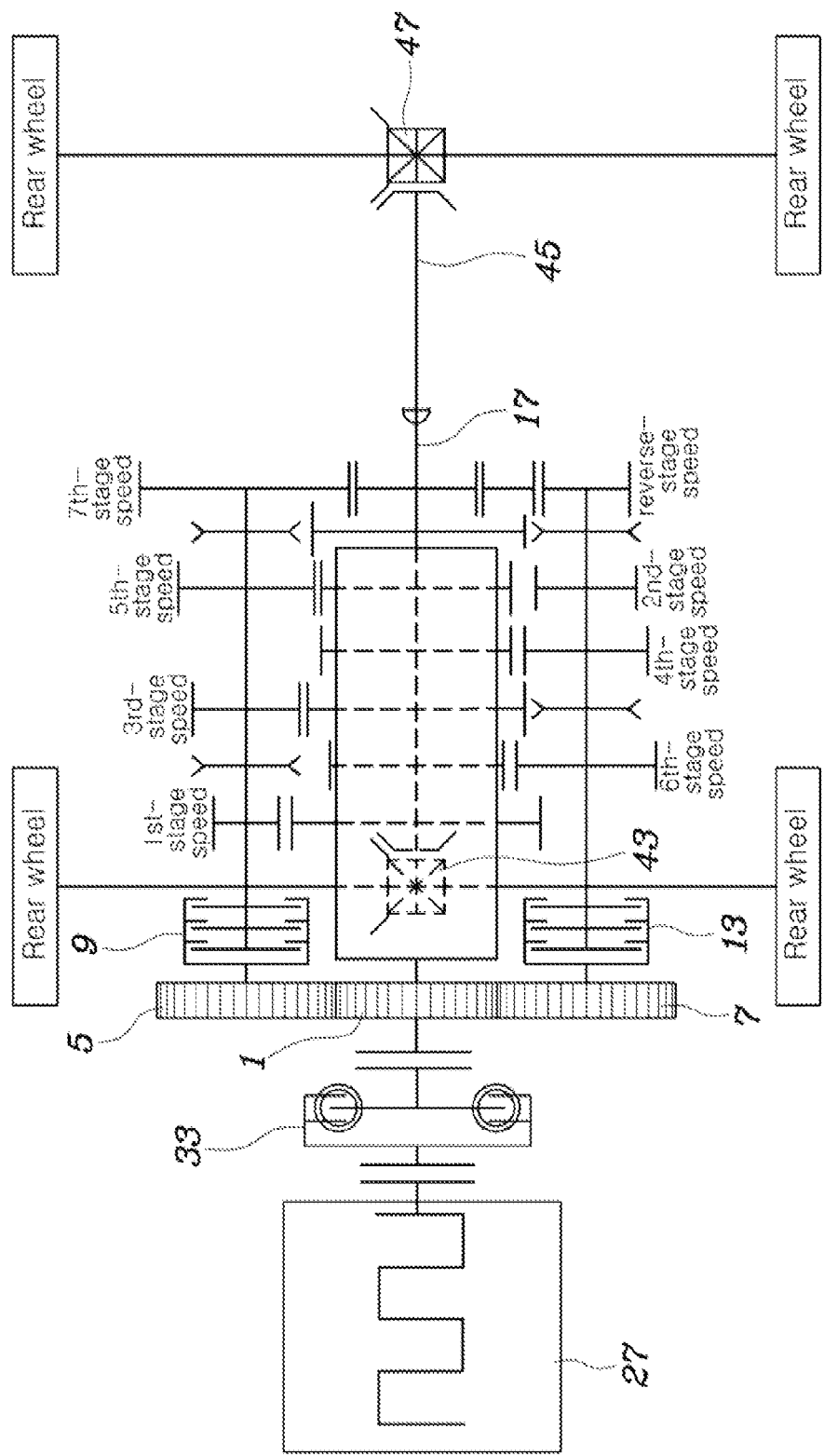
FIG. 9 is a view showing an exemplary hybrid power train for vehicles according to the present invention.

In the meantime, FIG. 9 shows a four-wheel drive using a power train according to various embodiments of the present invention, wherein a front wheel-differential gear 43 and a propeller shaft 45 are connected to an output shaft 17, and a rear wheel-differential gear 47 is connected to the propeller shaft 45, so that the front wheels and the rear wheels are all driven.

For convenience in explanation and accurate definition in the appended claims, the terms front or rear, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A hybrid power train for vehicles comprising:
   an input shaft having a driving gear;
   first and second driven gears meshing with and driven by the driving gear;
   a first driving shaft selectively engaging to the first driven gear by a first clutch, wherein the first driving shaft is substantially parallel with the input shaft;
   a second driving shaft selectively engaging to the second driven gear by a second clutch, wherein the second driving shaft is substantially parallel with the input shaft;
   an output shaft substantially parallel with the first and second driving shafts;
   a plurality of first transmission driving gears provided on the first driving shaft and a plurality of second transmission driving gears provided on the second driving shaft selectively engaging a plurality of transmission driven gears provided on the output shaft to obtain multiple transmission stage speeds;
   a plurality of synchronizing devices enabling the plurality of first and second transmission driving gears to selectively synchronize with the first or second driving shafts; and
   an electric motor having a rotary shaft substantially parallel with the first driving shaft, second driving shaft, and output shaft to provide power to the driving gear; and
   a length is defined by the longest one of the first driving shaft, the second driving shaft and the output shaft, wherein the first driving shaft, the second driving shaft and the output shaft are disposed within said length;
   wherein axes of the rotary shaft of the electric motor, the first driving shaft, the second driving shaft, and the output shaft define a rhombus or quadrilateral; and
   wherein the rotary shaft of the electric motor is continuously engaged, directly or indirectly, with the input shaft.

2. The hybrid power train for vehicles according to claim 1, wherein the rotary shaft of the electric motor is continuously engaged to the input shaft through the driving gear.

3. The hybrid power train for vehicles according to claim 1, wherein the rotary shaft of the electric motor is continuously engaged to the input shaft through a pinion that meshes with the driving gear.

4. The hybrid power train for vehicles according to claim 1, wherein an engine is operably coupled to the input shaft having the driving gear via a main clutch.

5. The hybrid power train for vehicles according to claim 1, wherein a damper is interposed between the engine and the driving gear in order to offset distortion vibrations of the engine.

6. The hybrid power train for vehicles according to claim 1, wherein the output shaft includes a final reduction gear meshing with a front wheel-differential gear.

7. The hybrid power train for vehicles according to claim 1, wherein a propeller shaft is operably coupled to the output shaft, and a rear wheel-differential gear is operably coupled to the propeller shaft.

8. The hybrid power train for vehicles according to claim 1, wherein a front wheel-differential gear and a propeller shaft are operably coupled to the output shaft, and a rear wheel-differential gear is operably coupled to the propeller shaft.

* * * * *